United States Patent Office 3,251,893
Patented May 17, 1966

3,251,893
CYCLOOLEFIN TRIMERS
Julian Feldman, Bernard A. Saffer, and Martin Thomas, Cincinnati, Ohio, assignors to National Distillers and Chemical Corporation, New York, N.Y., a corporation of Virginia
No Drawing. Filed Dec. 31, 1962, Ser. No. 248,261
10 Claims. (Cl. 260—666)

This invention relates to a process to the production of cycloolefin trimers from conjugated open chain diolefins, and particularly to the production of 1,5,9-cyclododecatriene. More particularly, this invention relates to new catalysts, and to a method for producing 1,5,9-cyclododecatriene by the condensation of three molecules of 1,3-butadiene using these catalysts.

The prior art shows the production of 1,5,9-cyclododecatriene as a by-product in the manufacture of dimeric 1,5-cyclooctadiene from 1,3-butadiene using a catalyst derived from nickel carbonyl by the replacement of at least one of the carbonyl groups thereof with certain alkyl or aryl phosphines, phosphites or stibines. Using such catalysts, however, the 1,5,9-cyclododecatriene is the minor product in a reaction which yields essentially 1,5-cyclooctadiene, and the yield will not exceed 10%. The catalyst developed for the production of 1,5,9-cyclododecatriene as a major product is a mixture of aluminum alkyls hydride and titanium or chromium trihalides, and certain later modifications thereof.

1,5,9-cyclododecatriene is a non-conjugated triene which exists in at least two isomeric forms: (a) trans, trans, trans- and (b) cis, trans, trans-. In the first process the predominant isomer is the trans, trans, trans-1,5,9-cyclododecatriene; in the latter process, the predominant isomer is the cis, trans, trans-isomer.

It is an object of this invention to provide a process for the production of cyclic trimers from open chain diolefinic compounds, and particularly for the production of 1,5,9-cyclododecatriene from 1,3-butadiene in high yields.

It is a further object of this invention to provide new catalysts for the catalytic production of 1,5,9-cyclododecatriene from 1,3-butadiene.

Further objects will be apparent to those skilled in the art from a consideration of the following description.

It has now been found that when 1,3-butadiene is polymerized with a nickel catalyst which is characterized by the following formula:

$$A_{0,1,2}-Ni-B_2$$

wherein A is selected from the group consisting of a methyl phosphite and triphenyl stibine, and B is selected from the group consisting of cinnamonitrile, acrylonitrile and acrolein, the selectivity of the catalyst is modified so as to give as the principal product the trans, trans, trans-1,5,9-cyclododecatriene, along with smaller quantities of 1,5-cyclooctadiene and 4-vinyl-1-cyclohexene.

Compounds having the above defined general structure where A is zero (the parent compounds) have been reported in the preparation of a group of complexes having the formula Ni(ligand)$_2$ where the ligand is acrylonitrile, acrolein, cinnamonitrile and fumaronitrile. These compounds are prepared, for example, by refluxing nickel carbonyl with the ligand for several hours in an anhydrous solvent; or in a large volume of the participating ligand. Acrolein and acrylonitrile are preferably distilled and stabilized with hydroquinone before use. Care is taken to remove atmospheric oxygen by flushing the reaction vessel with nitrogen before refluxing. The amount of nickel carbonyl used varies from about 0.05 to 0.10 mole while that of the ligand varies from about 0.06 to 0.20 mole. However, in each case the ratio of nickel carbonyl to ligand is about 1:2. During refluxing, carbon monoxide is evolved, which can be measured to determine whether the reaction is quantitative, and the crystalline complexes are formed. The complexes are filtered, washed with a solvent such as methanol and ether, and dried, for example, on a sintered glass funnel under nitrogen. For convenient handling the funnel containing the dry crystals is then stoppered and sealed before being transferred to a "dry bag" where the crystals are placed in a bottle and stored under nitrogen until used.

The adducts are prepared by refluxing the parent compound in a solution of the various ligands under an inert atmosphere until there is a definite color change using reaction times of from 4 to 20 hours. The mono-adduct is obtained when the ratio of parent compound to ligand is 1:1. Generally, the bis-adduct is obtained only when the ligand is present in considerable excess. Exclusion of atmospheric oxygen is necessary. Therefore, all operations such as loading the reaction vessel, filtering, drying and weighing of complexes are performed in an inert atmosphere.

The concentration of catalyst has been conveniently utilized in the polymerization reaction at about 1% of the amount of the diolefin charged. However, higher or lower catalyst concentrations are practical. As low as 0.5% of catalyst gives excellent results, and about 3% has been used successfully. A range of from between 0.1 to 10% by weight is preferred.

The conjugated diolefins especially suitable as starting materials for our invention have from about four to eight carbon atoms. The preferred diolefin is 1,3-butadiene; other conjugated open chain diolefins, particularly 1,3-diolefins, are useful, including 2-methyl-1,3-butadiene (isoprene); 2,3 - dimethyl - 1,3 - butadiene; 2-chloro - 1,3 - butadiene (chloroprene); 2,3-dichloro - 1,3-butadiene; 1,3-pentadiene (piperylene); phenyl diolefins; and 2,4-hexadiene; mixed halogen derivatives may be used, including chloro-fluoro-1,3-butadienes.

It is desirable but not essential to use a polymerization inhibitor such as p-tertiary butyl catechol to prevent the formation of unwanted by-products. The maximum p-tertiarybutyl catechol concentration tolerable in the reaction mixture is about 0.2% based on 1,3-butadiene. The product ratio decreases when higher concentrations are used. A small amount of polymer is formed when less than 0.05% inhibitor is used.

If the reagents are not adequately dry, it is beneficial to pretreat with a dehydrating agent, or to incorporate a dehydrating agent in the reaction mixture. Suitable materials for this purpose are ethylene oxide, calcium oxide, calcium carbide, and calcium sulfate.

Oxygen must be excluded from the reaction mixture. This is very important; even the small traces of oxygen found in ordinary nitrogen are deleterious. Although many of the catalysts are stable to the air, once they enter into the reaction they become extremely sensitive to oxygen. When oxygen is prevented from entering, the catalyst can often be reused.

The yield of 1,5,9-cyclododecatriene varies with temperature. The polymerization reaction is carried out at elevated temperatures. Temperatures within the range of about 70° C. to about 160° C. are satisfactory, and the preferred range is from about 100° to 130° C. At higher temperatures the rate of formation of 4-vinyl-1-cyclohexene by thermal dimerization of 1,3-butadiene as well as the polymerization of 1,3-butadiene becomes appreciable. The rate of formation of 1,5,9-cyclododecatriene at temperatures below about 70° C. is usually too low for practical purposes.

Widely varying pressures have been successfully used. By way of example, dimerization according to this invention may take place at atmospheric pressure by dissolving the diolefin in a liquid mixture of solvent, catalyst, and activator, by bubbling the olefin, if gaseous, into the mixture. On the other hand, pressures as high as 1790 p.s.i. have been utilized.

The time is not critical. The reaction is usually substantially complete within one-half to 20 hours. The preferred time is from about 2 to about 15 hours.

When the reaction is complete, the volatile constituents of the reaction mixture are preferably removed by vacuum distillation or steam distillation from polymeric material, calcium salts, and catalyst. The volatile constituents are condensed and the condensate fractionally distilled to recover the separate products.

The following examples illustrate methods of carrying out the present invention but it is to be understood that these examples are given for purposes of illustration and not of limitation.

Example 1

Bis(triphenylstibine) nickel dicinnamonitrile was prepared by refluxing 0.71 g. of nickel dicinnamonitrile with 2.0 g. of triphenylstibine in 50 cc. of ether for 10 hours. The crystalline product was filtered, washed with ether and dried under a nitrogen atmosphere.

Bis(trimethylphosphite) nickel diacrylonitrile was prepared by refluxing 1.3 g. of nickel diacrylonitrile in a solution of 4,2 g. of trimethylphosphite in 55 cc. of ether for 8 to 12 hours. The yellow flakes were filtered. The compound was slightly soluble in ether.

Bis(triphenylstibine) nickel diacrolein was prepared by refluxing 0.3 g. of solid nickel diacrolein in a solution of 10.0 g. of triphenylstibine in 50 cc. of ether for 4 hours. The product was filtered and washed with ether.

Table I shows the yields and analyses of these and the parent compounds.

TABLE I

| Ligand [a] | Solvent [b] | Yield (percent) | Composition Ni, percent | | I.R. Absorption Characteristic Band [c] | | |
|---|---|---|---|---|---|---|---|
| | | | Theory | Found | CN | CO | $\phi$ |
| Nickel dicinnamonitrile | E | 36 | 18.5 | 18.8 | S | | S |
| 2 $\phi_3$Sb | E | 33 | 5.7 | 9.0 | S | | W |
| Nickel diacrylonitrile | | 88 | | | S | | |
| (MeO)$_3$P | H | 40 | 20.3 | | S | | |
| 2(MeO)$_3$P | E | 4 | 14.2 | | W | | |
| Nickel diacrolein | | 67 | | | | S | |
| 2 $\phi_3$Sb | E | 80 | 6.7 | 5.5 | | S | S |

[a] $\phi$ stands for phenyl.
[b] E—Ether; H—Hexane.
[c] S—Strong; W—Weak.

In order to compare the relative efficiencies of the various catalysts in the polymerization reaction, standardized techniques were used so as to eliminate chance variables that could affect the rate of reaction. The materials used were:

| | Percent |
|---|---|
| Catalyst | 1–5 |
| Inhibitor (p-tertiarybutyl catechol) | 0.1 |
| Calcium carbide | 1–10 |
| p-Xylene | 10 |
| 1,3-butadiene | Remainder | p-Xylene served as an internal standard in the vapor phase chromatographic analysis of the reaction mixture. It was purified by passing it through a one-foot column of silica gel.

p-Tertiary butyl catechol served as a polymerization inhibitor for butadiene and the oligomers formed. Oxygen-free nitrogen was obtained by passing water pumped "pre-purified nitrogen" containing 0.001% $O_2$ maximum through No. 4A microsieves, and then through Harshaw 4% copper catalyst on alumina at 240° C. The microsieves and copper catalyst were preactivated by passing through hydrogen at 300° C. in excess of about 2 hours. Liquid butadiene was obtained by distillation from C.P. cylinder butadiene into a nitrogen-purged serum-capped glass bottle packed in Dry Ice. Lump calcium carbide was freshly ground under nitrogen in a mortar and pestle to about 20 mesh.

Reactions were carried out in 10 ml. 5/16″ x 8″ stainless steel microreactors having covers at the bottom. The top covers were connected to midget valves by means of glands and 1/16″ stainless steel tubing. Teflon gaskets cut from sheet by suitable cork borers minimized leakage. The reactor was charged as follows: With the top cover off, it was purged with nitrogen. One-half gram of freshly ground calcium carbide was added, followed by 0.3 ml. of a solution of p-tertiary butyl catechol (1.07 wt. percent) in p-xylene. The catalyst was then added, under nitrogen. When inert atmosphere was unnecessary, the catalyst was added in solution with the p-xylene and p-tertiary butyl catechol. The reactor was then capped and pressured to 200 p.s.i.g. with oxygen-free nitrogen. It was tested for leaks by immersion in hexane, after which it was cooled by packing in solid $CO_2$. The gland in the top cover was then removed and the opening temporarily plugged with a small 3/16 inch rubber serum cap. Approximately 6 ml. of liquid butadiene was added to the reactor through the serum cap by means of a hypodermic syringe which had been cooled by packing it in solid $CO_2$ for a short period of time. The serum cap was then removed and replaced quickly with the gland carrying the midget valve. The reactor was purged six times with oxygen-free nitrogen by repeatedly pressuring to 200 p.s.i.g. and releasing to atmosphere. The reaction mixture was heated at 120° C. overnight by placing the reactor in an oil bath equipped with thermostat controls. The products were analyzed by vapor phase chromatography. The yields from these catalysts are shown in Table II and the principal product was trans, trans, trans-1,5,9-cyclododecatriene.

TABLE II

| | Yield CDT [1], percent | Yield COD [1], percent |
|---|---|---|
| Bis(trimethylphosphite) nickel dicarbonyl | 9 | 62 |
| Nickel dicinnamonitrile | 57 | 11 |
| Trimethylphosphite nickel diacrylonitrile | 58 | 17 |
| Bis(triphenylstibine) nickel diacrolein | 44 | 4.5 |
| Bis(triphenylstibine) nickel dicinnamonitrile | 39 | 5.4 |

[1] CDT—1,5,9-cyclododecatriene; COD—1,5-cyclooctadiene.

From Table II it is to be observed that the yields of the trimer using the known Reed catalyst, bis(trimethylphosphite) nickel dicarbonyl is only 9%, whereas, under the same operating conditions, the yield of the trimer using the comparable new catalyst of this invention, namely trimethylphosphite nickel diacrylonitrile, has been increased to 58%.

Various changes and modifications may be made in carrying out the present invention without departing from the spirit and scope thereof. Insofar as these changes and modifications are within the purview of the annexed claims, they are to be considered as part of the invention.

What is claimed is:

1. A process for the production of a susbtantial amount of cycloolefin trimers which comprises polymerizing a conjugated diolefin having from about 4 to 8 carbon atoms per molecule at an elevated temperature by contacting said diolefin with a catalyst selected from the group consisting of nickel dicinnamonitrile, mono-trimethylphosphite nickel diacrylonitrile, bis(triphenylstibine) nickel diacrolein, and bis(triphenylstibine) nickel dicinnamonitrile.

2. A process for the production of a substantial amount of 1,5,9-cyclododecatriene which comprises polymerizing 1,3-butadiene at a temperature within the range of about 70° to 160° C. by contacting said 1,3-butadiene with a catalyst selected from the group consisting of nickel dicinnamonitrile, mono-trimethylphosphite nickel diacrylonitrile, bis(triphenylstibine) nickel diacrolein, and bis-(triphenylstibine) nickel dicinnamonitrile, said nickel catalyst being present in an amount from about 0.5 to 5% by weight of the 1,3-butadiene.

3. The process of claim 1 wherein said conjugated diolefin is 1,3-butadiene.

4. The process of claim 1 wherein said catalyst is nickel dicinnamonitrile.

5. The process of claim 1 wherein said catalyst is mono trimethylphosphite nickel diacrylonitrile.

6. The process of claim 1 wherein said catalyst is bis-(triphenylstibine) nickel diacrolein.

7. The process of claim 1 wherein said catalyst is bis-(triphenylstibine) nickel dicinnamonitrile.

8. A catalyst selected from the group consisting of bis-(triphenylstibine) nickel diacrolein, and bis(triphenylstibine) nickel dicinnamonitrile.

9. Bis(triphenylstibine) nickel diacrolein.

10. Bis(triphenylstibine) nickel dicinnamonitrile.

References Cited by the Examiner

UNITED STATES PATENTS

| | | | |
|---|---|---|---|
| 2,504,016 | 4/1950 | Foster | 260—666 |
| 2,686,208 | 8/1954 | Reed | 260—666 |
| 2,686,209 | 8/1954 | Reed | 260—666 |
| 2,991,317 | 7/1961 | Sellers et al. | 260—666 |

FOREIGN PATENTS

| | | |
|---|---|---|
| 1,295,072 | 4/1962 | France. |
| 1,300,595 | 6/1962 | France. |

OTHER REFERENCES

Schrauzer, J. American Chemical Society, vol. 81, pp. 5310–12, relied on (1959).

Schrauzer, J. American Chemical Society, vol. 82, pp. 1008–9, relied on (1960).

DELBERT E. GANTZ, *Primary Examiner.*

ALPHONSO D. SULLIVAN, *Examiner.*

C. E. SPRESSER, L. FORMAN, V. O'KEEFE, *Assistant Examiners.*